INVENTORS
Warren J. Schmidt and
Bernard E. Lenehan

ATTORNEY

Feb. 24, 1970 W. J. SCHMIDT ET AL 3,497,804
SINGLE ELEMENT MEASURING DEVICE AND TRANSDUCER
FOR MEASURING POLYPHASE POWER
Original Filed Nov. 21, 1960 3 Sheets-Sheet 2

United States Patent Office 3,497,804
Patented Feb. 24, 1970

3,497,804
SINGLE ELEMENT MEASURING DEVICE AND TRANSDUCER FOR MEASURING POLYPHASE POWER
Warren J. Schmidt, Upper Montclair, and Bernard E. Lenehan, Bloomfield, N.J., assignors to Westinghouse Electric Corporation, Pittsburgh, Pa., a corporation of Pennsylvania
Continuation of application Ser. No. 70,552, Nov. 21, 1960. This application Aug. 24, 1964, Ser. No. 393,002
Int. Cl. G01r 21/00, 29/16, 19/00
U.S. Cl. 324—107
17 Claims

ABSTRACT OF THE DISCLOSURE

A single-element watt-hour meter is arranged for energization through a transducer for measuring energy in a polyphase system. The transducer includes a loop energized by two phase currents of the polyphase system. The transducer loop supplies proper current energization for the watt-hour meter.

---

This invention relates to a polyphase-responsive device and it has particular relation to a device for measuring a function of the product of voltage and current and power factor in a polyphase electrical system.

This application is a continuation of application Ser. No. 70,552, now abandoned, filed Nov. 21, 1960.

Although aspects of the invention are suitable for response to various quantities, the invention is particularly suitable for measuring power or energy in a polyphase electrical system and it will be described primarily for measuring real power or energy supplied by a polyphase electrical system to a load.

In the prior art, it has been the practice to supply a single-element wattmeter or watt-hour meter for measuring the real power or energy supplied by a single-phase alternating-current system to a load. For corresponding polyphase measurements it has been the practice to supply a plural-element polyphase wattmeter or watt-hour meter.

In accordance with the invention, a conventional single-element meter is employed for measuring power or energy supplied to a load by either a single-phase or a polyphase electrical system. Preferably, the meter is of the conventional detachable type. For single-phase measuring purposes, the meter may be associated with a conventional meter socket connected in a known manner to the single-phase electrical system.

When a polyphase quantity is to be measured, a polyphase meter socket is associated with the desired polyphase electrical circuit. A transducer then is positioned between the socket and the single-phase meter for the purpose of converting the desired polyphase quantity into a single-phase quantity suitable for energizing the single-phase meter. The transducer may have conveniently a socket portion with contact jaws for detachably receiving the detachable single-phase meter. The transducer also may have contact blades for detachable reception in contact jaws of the polyphase meter socket.

In a preferred embodiment of the invention, the transducer includes a network having a loop which is energized by two current components derived respectively from two phase currents of the polyphase electrical system. The network also includes phase-shifting means for establishing a proper phase relationship between the two current components to produce a resultant single-phase current in an arm of the loop. This resultant single-phase current is employed for supplying current energization to the single-phase watt-hour meter. By supplying a suitable voltage to the meter which is derived from the polyphase electrical system, the meter is properly energized to measure a function of the voltage and current to measure a function of the voltage and current in the polyphase electrical system.

Preferably, the translating device or meter, the transducer and the socket are separable or detachable to permit the construction of different arrays for single-phase and polyphase measuring purposes.

It is therefore an object of the invention to provide an improved device which is selectively responsive to either a single-phase or a polyphase electrical quantity.

It is another object of the invention to provide an improved device for combining two current components to form a resultant current which is representative of a polyphase electrical quantity.

It is also an object of the invention to provide a transducer for converting a single-phase device for respone to a polyphase quantity.

It is a further object of the invention to provide a transducer having a loop circuit with two current components flowing in a portion of the circuit, the components being phase shifted to produce a desired resultant current.

It is an additional object of the invention to provide an assembly comprising a translating device, a transducer and a socket which are separable to permit different arrays of the components for single phase and polyphase operations.

It is also an object of the invention to provide an improved reactor having separate adjustments for phase and magnitude of the impedance of the reactor.

Other objects of the invention will be apparent from the following description taken in conjunction with the accompanying drawings, in which.

Figure 1:
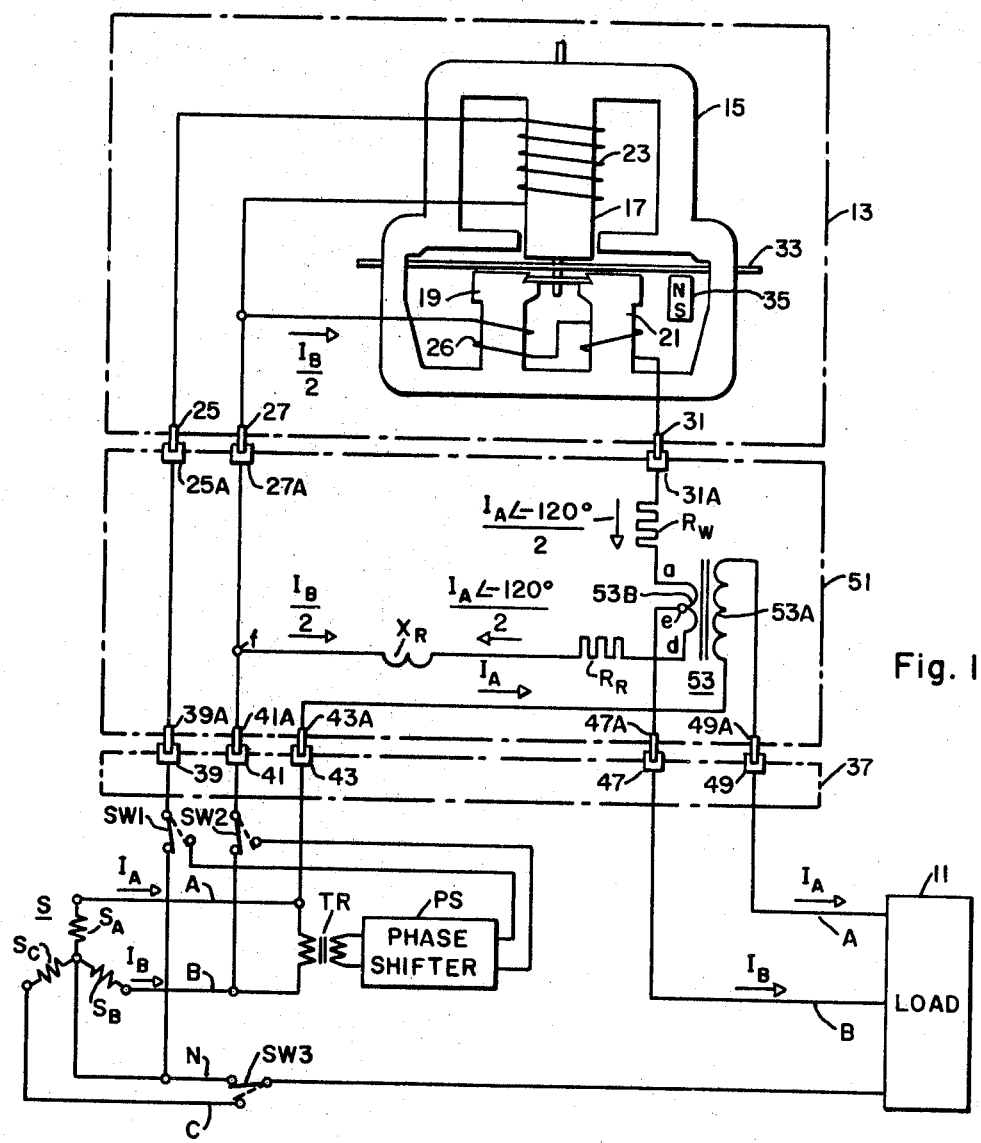
FIGURE 1 is a schematic view with parts shown in elevation and parts broken away of a measuring device embodying the invention.

Referring to the drawings, FIG. 1 shows a source of polyphase alternating energy which is represented by three phase windings $S_A$, $S_B$ and $S_C$ which may be connected in star. It will be assumed that the source is a three-phase source designed for operation at a power frequency such as 60 cycles per second. The source is connected by three conductors to energize a load 11. For present purposes, it will be assumed that the three conductors include a conductor A carrying the phase current $I_A$, a conductor B carrying the phase current $I_B$ and a neutral conductor N which is connected to the neutral point of the star-connected source S. Such a three-wire system is conventionally known as a network system.

In order to measure a quantity present in the polyphase electrical system, a single-phase translating device 13 is provided. In a preferred embodiment of the invention, this translating device 13 includes a two-wire single-phase detachable watt-hour meter having a magnetic structure 15 which provides a voltage pole 17 and current poles 19 and 21. A voltage winding 23 surrounds the voltage pole and has its ends connected to contact blades 25 and 27. A current winding 25 has turns disposed on the current poles 19 and 21 and has its terminals connected to contact blades 27 and 31. An electroconductive armature in the form of a disc 33 has a portion disposed in the air gap between the voltage pole 17 and the current poles 19 and 21. The armature rotates through the field of a permanent magnet 35 which is employed for damping rotation of the armature. Rotations of the armature are counted or measured by a conventional register (not shown). The construction and operation of such a single-phase meter are well understood in the art.

The meter is associated with a socket 37 having contact jaws 39, 41, 43, 47 and 49. The contact jaws 39, 41, and 47 are shown as positioned to receive detachably the contact blades 25, 27 and 31. When the contact blades are so received in the associated contact jaws, these contact jaws may be connected to a single-phase circuit to measure energy supplied to a single phase load in a manner well understood in the art.

In order to measure a polyphase quantity, a transducer 51 is interposed between the translating device 13 and the socket 37. This transducer has contact jaws 25A, 27A, and 31A for detachably receiving respectively the contact blades 25, 27 and 31. In addition, the transducer has contact blades 39A, 41A, 43A, 47A and 49A for detachable reception respectively in the contact jaws 39, 41, 43, 47 and 49. The contact jaws 25A and 27A are connected respectively to the contact blades 39A and 41A. Inasmuch as the contact jaws 39 and 41 are connected respectively to the conductors N and B through single-pole, double-throw switches SW1 and SW2, it follows that the voltage winding 23 is energized in accordance with the voltage $E_{BN}$ which appears across these conductors. The contact jaws 41 and 43 are connected respectively to the portions of the conductors B and A which are adjacent the source S. The contact jaws 47 and 49 are connected respectively to the portions of the conductors B and A which are adjacent the load 11.

The current winding 26 is connected through the contact blades 27 and 31 and the contact jaws 27A and 31A across two terminals $e$ and $f$. It will be understood that this winding has both reactance and resistance. Reactance $X_W$ of the winding is assumed to be represented by the winding itself. The resistance of the winding 26 is separately represented by a resistor $R_W$.

An additional circuit is connected between the terminals $e$ and $f$ which includes a reactance $X_R$ and a resistor $R_R$. The current winding 26, reactor $X_R$ and the resistor $R_R$ form parts of a loop circuit having two arms connected in parallel between the terminals $e$ and $f$. These terminals are connected respectively to the contact blades 41A and 47A. Consequently, the phase current $I_B$ divides between the two parallel arms, and supplies a current component to the winding 26 which has a magnitude and phase relation which corresponds to those of the phase current $I_B$.

Preferably, the two arms have equal impedances. With the arms equal in impedance, a current $I_B/2$ is supplied to the current winding 26. Arrows show direction of current flow at one instant.

A second current component is directed through the loop containing the current winding 26 which is dependent on the phase current $I_A$. To this end a transformer preferably in the form of a mutual reactor 53 has a primary winding 53A connected across the contact blades 43A and 49A for energization by the phase current $I_A$. The current flowing through the primary winding 53A produces an open circuit voltage $E_{ad}$ across a secondary winding 53B which is displaced from the primary current by a substantial angle. The secondary winding 53B is included in the loop circuit and the terminal $e$ constitutes a center tap on the secondary winding. The mutual reactor and the loop are so proportioned that the mutual reactor supplies to the loop a current component $$\frac{I_A}{2}\underline{/-120°}$$

Figure 2:
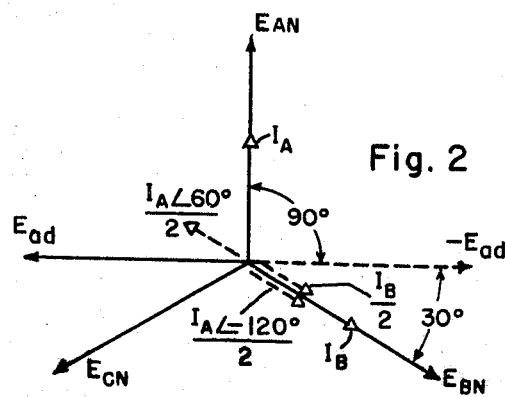
FIG. 2 is a vector diagram showing voltage and current relationships present in the system of FIG. 1.

The various phase relationships of the voltage and current quantities are shown by vectors in FIG. 2. The three phase voltages $E_{AN}$, $E_{BN}$ and $E_{CN}$ are equal in magnitude and the adjacent vectors are spaced from each other by 120°. For optimum accuracy, these voltages should always be equal in magnitude and equally spaced from each other as shown. Also, the frequency of the system should remain at its rated value. These conditions are adequately satisfied by modern distribution systems.

The phase currents $I_A$ and $I_B$ are shown respectively in phase with the related phase voltages $E_{AN}$ and $E_{BN}$. Inasmuch as the phase current $I_B$ flows in parallel through two arms of a loop circuit having equal impedances, a current $I_B/2$ is supplied to the current winding 26. When energized by the voltage $E_{BN}$ and the current component $I_B/2$ having the phase angle $\theta_B$ therebetween, the watt-hour having the phase angle $\theta_B$ therebetween, the watt-hour meter measures the power component shown by the following expression: ½ $E_{BN}I_B \cos \theta_B$.

The voltage $E_{ad}$ may be shown leading or lagging the current $I_A$ depending on the polarities of the connections. The voltage $E_{ad}$ supplies to the loop a current which lags the voltage by an angle dependent on the impedance of the loop. The impedance is adjusted in the manner hereinafter discussed to provide the current component $$\frac{I_A}{2}\underline{/-120°}$$

when the polarities of the connections of the loop are properly selected. As shown in FIG. 2, this current component is in phase with the voltage $E_{BN}$ when the polyphase system operates at unity power factor. When the meter is energized by this current component and by the voltage $E_{BN}$, it measures a power component represented by the following expression: ½ $E_{AN}I_A \cos \theta_A$. In this expression the angle $\theta_A$ represents the angle between the vectors $I_A$ and $E_{AN}$.

From the foregoing analysis, it is clear that the meter responds to one-half the power $$(E_{BN}I_B \cos \theta_B + E_{AN}I_A \cos^\theta{}_A)$$

Therefore, if the reading of the meter is multiplied by 2, the result will be the energy consumed by the polyphase load. If desired, the meter may be calibrated to indicate this energy directly.

Assuming that the voltage $E_{ad}$ is displaced from the current $I_A$ by 90°, the current component produced in the loop circuit by the voltage $E_{ad}$ should lag the voltage by 30°. This current component flows through the resistance $R_W$ and the reactance $X_W$ of the current winding, the resistance $R_R$, the reactance $X_R$ and the reactance $X_M$ offered to the flow of current components by the mutual reactor 53. If the total impedance of the loop is represented by the expression $Z_N$, the following expression should be satisfied $$\tan 30° = \frac{\tfrac{1}{2}X_M + X_R}{R_R} = \frac{\tfrac{1}{2}X_M + X_W}{R_W}$$

$$2\pi fM = \frac{E_{ad}}{I_A} = \frac{Z_N}{2}$$

In these expressions, $f$ represents the frequency of the polyphase electrical system and M represents the mutual inductance between the windings of the mutual reactor.

The voltage applied to the voltage winding 23 may be derived in other manners. For example, the switches SW1 and SW2 may be operated to their dotted-line positions to apply the voltage across the conductors A and B through a transformer TR and a phase shifter PS to the voltage winding 23. The voltage thus applied to the voltage winding 23 is made equal to the voltage $E_{BN}$. Under such circumstances, the switch SW3 may be operated to its dotted-line position to replace the conductor N by the conductor C for supplying three-wire polyphase energization to a polyphase load 11.

If desired, the resistor $R_R$ and the reactor $X_R$ may be adjustable for the purpose of adjusting the impedance of the arm containing these elements relative to the impedance of the arm containing the current winding 26. Preferably, however, the two adjustments are both incorporated in the reactor. A construction suitable for this purpose is illustrated in FIG. 3.

Figure 3:
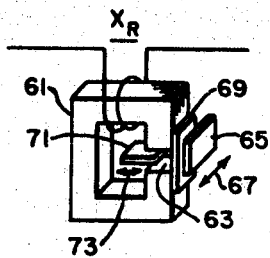
FIG. 3 is a view in perspective of a reactor which may be employed in the system of FIG. 1.

In FIG. 3 the reactor $X_R$ is provided with a magnetic circuit in the form of a magnetic structure 61 having an air gap 63. This air gap may be bridged to an adjustable extent by means of a soft magnetic bridging member or keeper 65 which is adjustable in the direction of the arrows 67. A non-magnetic spacer 69 is located between the magnetic bridge 65 and the magnetic structure 61. Consequently, by adjustment of the magnetic bridge or keeper 65, the reactance of the reactor $X_R$ may be adjusted.

For resistance adjustment, an electroconductive insert 71 is adjustable in the direction of the arrows 73 to vary the amount of electroconductive material located in the air gap. This varies the loss of the reactor $X_R$ and is equivalent to a resistance adjustment of the associated circuit.

Figure 4:
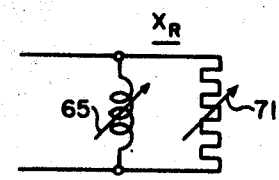
FIG. 4 is a circuit diagram showing the equivalent circuit of the reactor of FIG. 3.

The equivalent circuit of the reactor $X_R$ is shown in FIG. 4. The reactor in effect includes an inductance element and a resistor element connected in parallel. Adjustment of the magnetic bridge or keeper 65 adjusts the value of reactance of reactor $X_R$ whereas adjustment of the electroconductive member 71 adjusts the resistance value of the reactor.

Figure 5:
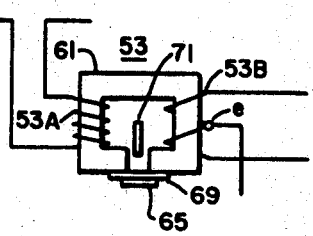
FIG. 5 is a schematic view with parts shown in elevation of a mutual reactor suitable for the system of FIG. 1.

In FIG. 5, a construction is shown which is suitable for the mutual reactor 53. The mutual reactor 53 includes the magnetic structure 61, the magnetic bridge or keeper 65 and the electroconductive member 71 discussed with reference to FIG. 3. The primary winding 53A and the secondary winding 53B, are linked with the magnetic structure 61.

Figure 6:
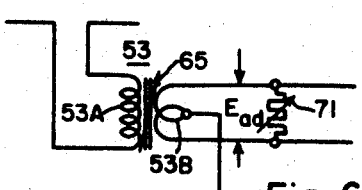
FIG. 6 is a schematic view showing an equivalent circuit for the mutual reactor of FIG. 5.

The equivalent circuit of the reactor 53 is shown in FIG. 6. Adjustment of the magnetic bridge or keeper 65 varies the reluctance of the magnetic circuit associated with the primary and secondary windings. Adjustment of the electroconductive member 71 in effect varies the resistance across the terminals of the secondary winding. Adjustment of the magnetic bridge or keeper 65 has the effect of varying the magnitude of the voltage $E_{ad}$ across the secondary winding. Adjustment of the electroconductive member 71 alters the phase angle between the voltage $E_{ad}$ and the current component which this voltage directs through the associated loop.

It should be noted that the adjustments of the keeper 65 and the member 71 do not affect the division of the current $I_B$ between the two parallel arms of the loop circuit.

Figure 7:
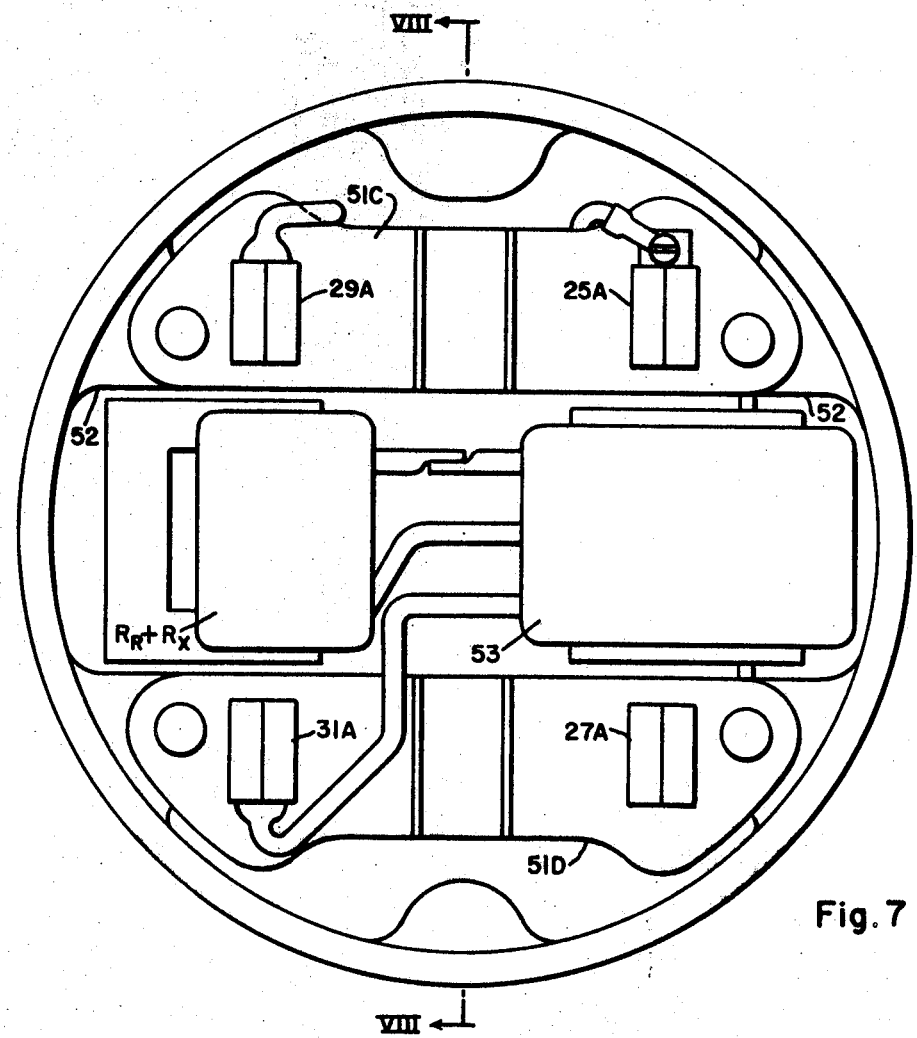
FIG. 7 is a view in elevation of a transducer which may be employed in the system of FIG. 1.
Figure 8:
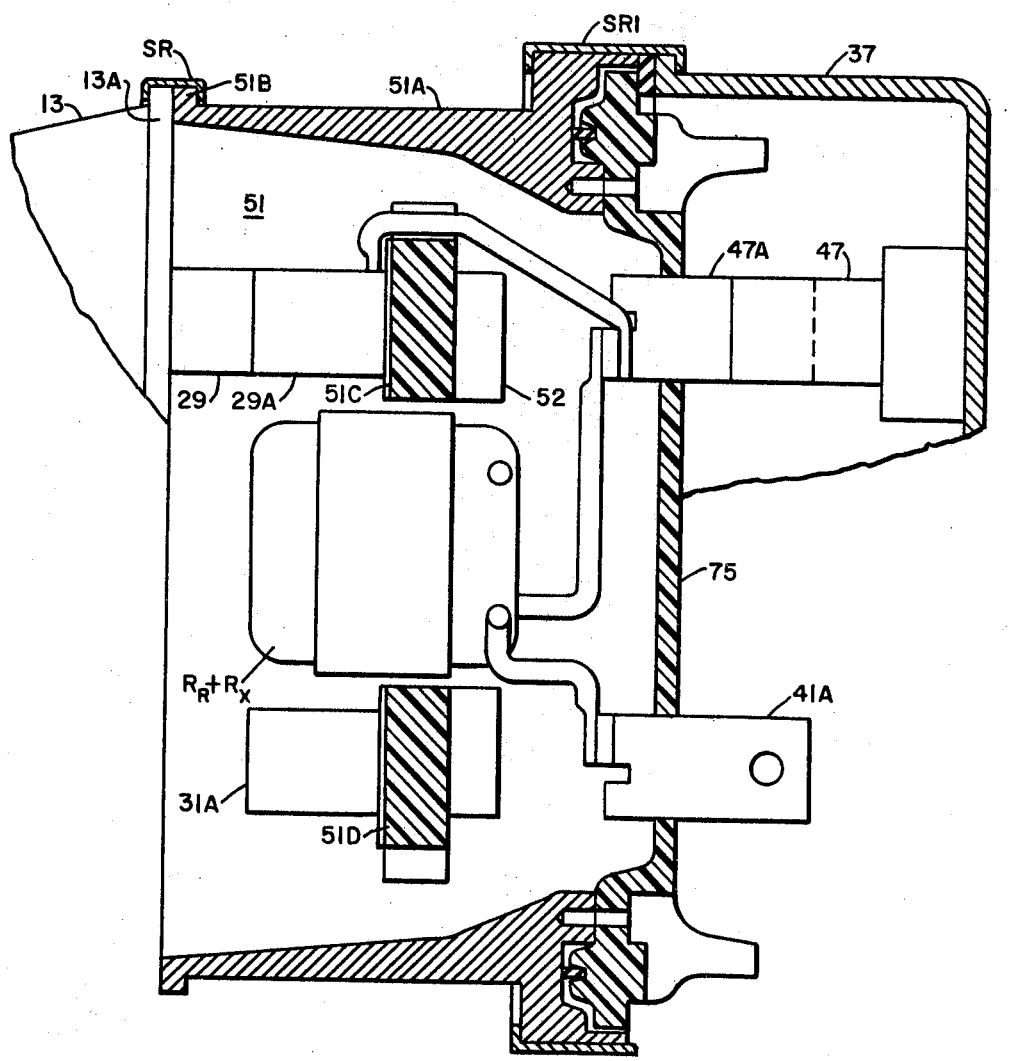
FIG. 8 is a view in section taken along the lines VIII—VIII of FIG. 7.

As previously pointed out, a detachable construction is preferred for the translating device 13, the insert device 51 and the socket 37. A suitable construction for the insert device 51 is shown in FIGS. 7 and 8. The insert device may include a tubular die-cast housing 51A having a flange 51B for abutting the base of a conventional detachable single-phase watt-hour meter. A conventional sealing ring SR may embrace the flange 51A and the flange 13A of a detachable watt-hour meter base. The contact jaw 25A and a contact jaw 29A are mounted on an insulating block 51C which is suitably secured to brackets 52 formed on the housing 51A (the contact jaw 29A is provided because four contact jaws conventionally are provided for a single-phase meter). In an analogous manner, the contact jaws 27A and 31A are mounted on an insulating block 51D which is secured to the housing 51A. The reactor which provides a resistance $R_R$ and the reactance $X_R$ together with the mutual reactor 53 are located in the housing 51A between the insulating blocks 51C and 51D. The right-hand end of the housing 51A as viewed in FIG. 8 is closed by a cylindrical base 75 which may be constructed of insulating material carrying the contact blades 39A, 41A, 43A, 47A and 49A. The base 75 together with the contact blades mounted thereon may be similar to the base assembly employed in a conventional polyphase detachable watt-hour meter.

The socket 37 in FIG. 8 is shown with its contact jaws positioned to receive the contact blades of the base 75. The socket 37 may be similar to a conventional polyphase watt-hour meter socket. A detachable sealing ring SR1 may engage flanges on the housing 51A and the socket 37.

Although the invention has been described with reference to certain specific embodiments thereof, numerous modifications falling within the spirit and scope of the invention are possible.

We claim as our invention:

1. In a device responsive to polyphase quantities in an electrical system having three conductors, an electroconductive loop having two terminals establishing first and second parallel arms of said loop, first coupling means effective when energized by a first alternating electrical input for directing a first alternating electrical current in a closed path around said loop, second coupling means effective when energized by a second alternating electrical input for directing a second alternating electrical current in parallel through said two arms to provide an addition of the alternating electrical currents in the first arm, one of said first and second coupling means including phase-shifting means effective when the first and second coupling means are energized respectively by two alternating inputs derived from the three conductors and displaced in phase from each other by 120° for bringing said first and second alternating electrical currents into phase with each other and electroresponsive means having an input circuit and having a detectable response dependent on alternating current energization of said input circuit, said input circuit being included in said first arm for energization in accordance with said addition, whereby said electroresponsive means is responsive to a single-phase current representing a polyphase quantity in the three conductors from which the first and second coupling means respectively derive their alternating inputs.

2. In a device responsive to polyphase quantities, an electroconductive loop having two terminals establishing first and second parallel arms of said loop, first coupling means effective when energized by a first alternating electrical input for directing a first alternating electrical current component in a closed path around said loop, second coupling means effective when energized by a second alternating electrical input for directing a second alternating electrical current component in parallel through said two arms to provide an addition of the alternating current components produced by the currents in the first arm, one of said coupling means including phase shifting means effective when the two coupling means are energized respectively by two alternating inputs displaced in phase from each other by 120° for bringing said first and second current components in the first arm into phase with each other, and power means responsive to a function of system power comprising first input terminals for receiving energization from a source of single-phase alternating voltage, second input terminals coupled for energization by said addition, and means for measuring the product of the energization of the energizations of the first and second input terminals and of a function of the phase angle therebetween.

3. In a measuring device, a measuring unit comprising voltage circuit means including first terminal means effective when energized from a source of alternating voltage for energizing the voltage circuit means, second terminal means having current circuit means connected therebetween and being effective when energized from a source of alternating current for energizing the current circuit means, electroresponsive means effective when said first and second terminal means are energized by alternating voltage and current respectively for producing a response dependent on the product of such energizations multiplied by a function of the phase angle between said energizations, a transformer having a secondary winding and a branch circuit including said secondary winding connected across said second terminal means and forming with said current circuit means a loop circuit, said loop circuit having first and second terminals dividing the loop circuit into first and second parallel arms, the first parallel arm including said current circuit means, whereby current entering and leaving this loop circuit by said terminals flows in parallel through the parallel arms, and whereby the current circuit means carries a resultant current dependent on the sum of the primary energization of the transformer and on current entering and leaving the loop circuit by said terminals.

4. In a measuring device, a measuring unit comprising voltage circuit means including first terminal means effective when energized from a source of single-phase alternating voltage for energizing the voltage circuit means, second terminal means having current circuit means connected therebetween and being effective when energized from a source of alternating current for energizing the current circuit means, electroresponsive means effective when said first and second terminal means are energized by single-phase alternating voltage and current respectively for producing a response dependent on the product of such energizations multiplied by a function of the phase angle between said energizations, a transformer having a secondary winding and a branch circuit including said secondary winding connected across said second terminal means and forming with said current circuit means a loop circuit, said loop circuit having first and second terminals dividing the loop circuit into first and second parallel arms, the first parallel arm including said current circuit means, whereby current entering and leaving this loop circuit by said terminals flows in parallel through the parallel arms, said transformer being constructed to supply current to the loop circuit which lags by 120° the primary current.

5. In a measuring device, a measuring unit comprising voltage circuit means including first terminal means effective when energized from a source of alternating voltage for energizing the voltage circuit means, second terminal means having current circuit means connected therebetween and being effective when energized from a source of alternating current for energizing the current circuit means, electroresposive means effective when said first and second terminal means are energized by alternating voltage and current respectively for producing a response dependent on the product of such energizations multiplied by a function of the phase angle between said energizations, a transformer having a secondary winding and a branch circuit including said secondary winding connected across said second terminal means and forming with said current circuit means a loop circuit, said loop circuit having first and second terminals dividing the loop circuit into first and second parallel arms, the first parallel arm including said current circuit means, whereby current entering and leaving this loop circuit by said terminals flows in parallel through the parallel arms, said first terminal being a center tap on said secondary winding, and said arms having equal impedances.

6. In a measuring device, a measuring unit comprising voltage circuit means including first terminal means effective when energized from a source of single-phase alternating voltage for energizing the voltage circuit means, second terminal means having current circuit means connected therebetween and being effective when energized from a source of single-phase alternating current for energizing the current circuit means, electroresponsive means effective when said first and second terminal means are energized by single-phase alternating voltage and current respectively for producing a response dependent on the product of such energizations multiplied by a function of the phase angle between said energizations, a transformer having a secondary winding, and a branch circuit including said secondary winding connected across said second terminal means and forming with said current circuit means a loop circuit, said loop circuit having first and second terminals dividing the loop circuit into first and second parallel arms, the first parallel arm including said current circuit means, whereby current entering and leaving this loop circuit by said terminals flows in parallel through the parallel arms, said measuring unit having a detachable construction wherein said first and second terminal means comprise detachable contact members, a socket unit having contact elements for detachably receiving contact members, and an insert structure for supporting said branch circuit and said transformer, said insert structure having contact elements for detachably receiving the contact members of the measuring unit, said insert structure having contact members for detachable reception in the contact elements of said socket unit, said circuit branch being connected across preselected contact elements of the insert structure, the primary winding of said transformer and said first and second terminals being connected to preselected contact members of said insert structure, whereby energy for the measuring unit can be derived from the socket unit.

7. In a measuring device for measuring a function of polyphase power, a measuring unit comprising voltage circuit means including first terminal means effective when energized from a source of single-phase alternating voltage for energizing the voltage circuit means, second terminal means having current circuit means connected therebetween and being effective when energized from a source of single-phase alternating current for energizing the current circuit means electroresponsive means effective when said first and second terminal means are energized by single-phase alternating voltage and current respectively for producing a response dependent on the product of such energizations multiplied by a function of the phase angle between said energizations, a transformer having a secondary winding, and a branch circuit including said secondary winding connected across said second terminal means and forming with said current circuit means a loop circuit, said loop circuit having first and second terminals dividing the loop circuit into first and second parallel arms, the first parallel arm including said current circuit means, whereby current entering and leaving this loop circuit by said terminals flows in parallel through the parallel arms, said transformer and loop circuit having characteristics which when alternating first and second alternating currents displaced in phase by 120° are applied respectively to the primary winding of the transformer and to the first and second terminals, and when an alternating first voltage in phase with the second current is applied to the first terminal means, are effective to bring the current in the secondary winding derived from the first current into phase with said first voltage.

8. In a network for converting a polyphase current at a power frequency to single phase current useful in measuring, a mutual reactor having primary and secondary windings, first and second terminal elements, a branch circuit connecting said secondary winding across said terminal elements, said branch circuit having first and second spaced terminals dividing the branch circuit into a first arm including said terminal elements and any circuit means connected thereacross and a second arm in parallel with the first arm across the spaced terminals, said second arm having an impedance which is substantially one half the value required across the secondary winding to cause secondary current in the branch circuit produced by the voltage across the secondary winding to lag 120° behind alternating current flowing through the primary winding, whereby when an impedance is connected across said terminal elements to give said first arm the same impedance as the second arm, a single-phase current is present in the first arm which depends on a function of a first phase of a polyphase current flowing in parallel through said arms and a second phase of a polyphase current flowing through the primary winding.

9. In a network for converting a polyphase current at a power frequency to a single-phase current useful in measuring, a mutual reactor having primary and secondary windings, first and second terminal elements, a branch circuit connecting said secondary winding across said terminal elements, said branch circuit having first and second spaced terminals dividing the branch circuit into a first arm including said terminal elements and any circuit means connected thereacross and a second arm in parallel with the first arm across the spaced terminals, said first terminal being a center tap on the secondary winding, said second arm having an impedance which is substantially one half the value required across the secondary winding to cause secondary current produced by the voltage across the secondary winding to lag 120° behind alternating current flowing through the primary winding, whereby when an impedance is connected across said terminal elements to give said first arm the same impedance as the second arm, a single-phase current is present in the first arm which depends on a function of a first phase of a polyphase current flowing in parallel through said arms and a second phase of a polyphase current flowing through the primary winding.

10. In a device for converting a polyphase current at a power frequency to a single phase current useful in measuring, a structure having a first portion constituting a socket having structure contact jaws for receiving detachably the contact blades of a detachable single element watt-hour meter, said structure having a second portion provided with structure contact blades for detachable reception in the contact jaws of a polyphase meter socket, a mutual reactor having a primary winding and a secondary winding, a branch circuit connecting said secondary winding across two contact jaws of the structure designed for connection to the current winding of a detachable single element watt-hour meter, said branch circuit having first and second points connected respectively to two of the contact blades of said structure to divide the branch circuit into a first arm including said two contact jaws and a second arm in parallel with the first arm across the two contact blades, said second arm having an impedance which is substantially one half the value required across the secondary winding to cause secondary current produced by the voltage across the secondary winding to lag 120° behind the alternating current flowing through the primary winding, said primary winding being connected across two contact blades of said structure, whereby when a detachable single element watt-hour meter is coupled to the contact jaws designed to receive such meter the first arm is completed by the current winding of such meter.

11. In a device for converting a polyphase current to a single phase current useful in measuring, a structure having a first portion constituting a socket having structure contact jaws for receiving detachably the contact blades of a detachable single element watt-hour meter, said structure having a second portion provided with structure contact blades for detachable reception in the contact jaws of a polyphase meter socket, a mutual reactor having a primary winding and a secondary winding having a center tap, and a single-element detachable watt-hour meter having meter contact blades detachably disposed in the structure contact jaws, said watt-hour meter having a current winding connected through the meter contact blades across first and second contact jaws of said structure, a branch circuit connecting said secondary winding across said first and second contact jaws of the structure to form with the current winding connected across such two contact jaws a loop circuit, said loop circuit having the center tap and a second point connected respectively to two of the contact blades of said structure to divide the loop circuit into a first arm including said current winding and a second arm in parallel with said first arm, said primary winding being connected across two contact blades of said structure, said first arm having an impedance substantially equal to the impedance of the second arm, said watt-hour meter having a voltage winding connected through the meter contact blades and the structure contact jaws across two of the structure contact blades, the value of said arm impedances being proportioned to cause secondary current to lag 120° behind primary current of said transformer.

12. In a network for converting a polyphase current at a power frequency to single phase current useful in measuring, a mutual reactor having primary and secondary windings, first and second terminal elements, a branch circuit connecting said secondary winding across said terminal elements, said branch circuit having first and second spaced terminals dividing the branch circuit into a first arm including said terminal elements and a second arm in parallel with the first arm across the spaced terminals, said second arm having an impedance which is substantially one half the value required across the secondary winding to cause secondary current produced by the voltage across the secondary winding to lag 120° behind alternating current flowing through the primary winding, means for adjusting the reactance of the second arm, and means for adjusting the resistance of the second arm, whereby an impedance having one half said value may be connected across the terminal elements to receive current components from the secondary winding and through said terminals.

13. In a network for converting a polyphase current to single phase current useful in measuring, a mutual reactor having primary and secondary windings, first and second terminal elements, a branch circuit connecting said secondary winding across said terminal elements, said branch circuit having first and second spaced terminals dividing the branch circuit into a first arm including said terminal elements and a second arm in parallel with the first arm across the spaced terminals, said second arm having an impedance which is substantially one half the value required across the secondary winding to cause secondary current produced by voltage across the secondary winding to lag 120° behind alternating current flowing through the primary winding, said second arm including a reactor having a magnetic circuit, means for adjusting the reluctance of the magnetic circuit and means for adjusting the loss of said magnetic circuit, whereby an impedance having one half said value may be connected across the terminal elements to receive current components from the secondary winding and through said terminals.

14. In a device responsive to quantities in an electrical system having three conductors, an electroconductive loop having two terminals establishing first and second parallel arms of said loop, coupling means for directing a first electrical current in a closed path around said loop, and coupling means for directing a second electrical current in parallel through said two arms to provide an addition of the current components produced by said two currents in the first arm, one of said arms including a reactor having a magnetic circuit, means for adjusting the reluctance of the magnetic circuit, means for adjusting the loss of the magnetic circuit, and electroresponsive means having an input circuit and having a response dependent on energization of the input circuit, said input circuit being included in said first arm for energization in accordance with said addition.

15. In a measuring device for measuring a function of polyphase power, a measuring unit comprising voltage circuit means including first terminal means effective when energized from a source of alternating voltage for energizing the voltage circuit means, second terminal means having current circuit means connected therebetween and being effective when energized from a source of alternating current for energizing the current circuit means, electroresponsive means effective when said first and second terminal means are energized by single-phase alternating voltage and current respectively for producing a response dependent on the product of such energizations multiplied by a function of the phase angle between said energizations, a transformer having a secondary winding, and a branch circuit including said secondary winding connected across said second terminal means and forming with said current circuit means a loop circuit, said loop circuit having first and second terminals dividing the loop circuit into first and second parallel arms, the first parallel arm including said current circuit means, whereby current entering and leaving this loop circuit by said terminals flows in parallel through the parallel arms, and a transformer having a secondary winding included in said loop circuit, said transformer having a reluctance-adjustable magnetic circuit, and means for adjusting the loss of said magnetic circuit.

16. In a measuring device for measuring a function of polyphase power, a measuring unit comprising voltage circuit means including first terminal means effective when energized from a source of alternating voltage for energizing the voltage circuit means, second terminal means having current circuit means connected therebetween and being effective when energized from a source of alternating current for energizing the current circuit means, electroresponsive means effective when said first and second terminal means are energized by alternating voltage and current respectively for producing a response dependent on the product of such energization multiplied by a function of the phase angle between said energizations, a transformer having a secondary winding, and a branch circuit including said secondary winding connected across said second terminal means and forming with said curret circuit means a loop circuit, said loop circuit having first and second terminals dividing the loop circuit into first and second parallel arms, the first parallel arm including said current circuit means, whereby current entering and leaving this loop circuit by said terminals flows in parallel through the parallel arms, a transformer having a secondary winding included in said loop circuit, said transformer having a reluctance-adjustable magnetic circuit, means for adjusting the loss of said magnetic circuit, said transformer comprising a magnetic circuit having an airgap, a winding effective when energized for directing magnetic flux around said magnetic circuit, magnetic means for adjustably bridging the airgap, and electroconductive means adjustable for intercepting an adjustable proportion of magnetic flux traversing said magnetic circuit, and said secondary winding comprising a center-tapped winding linked with said magnetic circuit.

17. A measuring device as claimed in claim 7 wherein said measuring unit comprises a two-wire, single element induction meter having a voltage coil and current windings, said voltage circuit means comprising said voltage coil and said current circuit means comprising said current windings, the secondary winding of said transformer having a center tap constituting said first terminal, said parallel arms having substantially equal impedances.

References Cited

UNITED STATES PATENTS

| | | | |
|---|---|---|---|
| 1,156,412 | 10/1915 | Lincoln | 324—106 |
| 1,722,157 | 7/1920 | Pratt | 324—107 |
| 1,953,519 | 4/1934 | Tritschler | 323—50 |
| 2,228,655 | 1/1941 | Downing et al. | 324—107 XR |
| 2,240,666 | 5/1941 | Mylius | 324—138 |
| 2,648,821 | 8/1953 | Petzinger | 324—107 XR |
| 2,785,379 | 3/1957 | Anderson et al. | 324—137 |
| 2,930,979 | 3/1960 | Clarke et al. | 324—107 |
| 2,997,653 | 8/1961 | Becker et al. | 324—137 XR |
| 3,155,903 | 11/1964 | Petzinger | 324—107 |

FOREIGN PATENTS

| | | |
|---|---|---|
| 24,074 | 1907 | Great Britain. |

ARCHIE R. BORCHELT, Primary Examiner

E. F. KARLSEN, Assistant Examiner

U.S. Cl. X.R.

321—57; 323—120